US011935496B2

(12) United States Patent
Sim et al.

(10) Patent No.: US 11,935,496 B2
(45) Date of Patent: *Mar. 19, 2024

(54) ELECTRO-OPTIC DISPLAYS, AND METHODS FOR DRIVING SAME

(71) Applicant: E Ink Corporation, Billerica, MA (US)

(72) Inventors: Teck Ping Sim, Acton, MA (US); Yuval Ben-Dov, Cambridge, MA (US); Joanna F. Au, Boston, MA (US); Kenneth R. Crounse, Somerville, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,642

(22) Filed: May 26, 2023

(65) Prior Publication Data

US 2023/0386422 A1 Nov. 30, 2023

Related U.S. Application Data

(63) Continuation of application No. 16/253,609, filed on Jan. 22, 2019, now Pat. No. 11,721,295, which is a (Continued)

(51) Int. Cl.
*G09G 3/34* (2006.01)

(52) U.S. Cl.
CPC ....... *G09G 3/344* (2013.01); *G09G 2310/061* (2013.01); *G09G 2320/0257* (2013.01); (Continued)

(58) Field of Classification Search
CPC .... G09G 3/3433; G09G 3/344; G09G 3/3446; G09G 3/3453; G09G 3/3466; (Continued)

(56) References Cited

U.S. PATENT DOCUMENTS

| | | | |
|---|---|---|---|
| 4,418,346 | A | 11/1983 | Batchelder |
| 5,760,761 | A | 6/1998 | Sheridon |

(Continued)

FOREIGN PATENT DOCUMENTS

| | | | |
|---|---|---|---|
| JP | 2010113281 | A | 5/2010 |
| JP | 2017120315 | A | 7/2017 |
| JP | 2017156365 | A | 9/2017 |

OTHER PUBLICATIONS

Wood, D., "An Electrochromic Renaissance?" Information Display, 18(3), 24 (Mar. 2002).

(Continued)

*Primary Examiner* — Amy Onyekaba
*Assistant Examiner* — Cory A Almeida
(74) *Attorney, Agent, or Firm* — Jason P. Colangelo

(57) ABSTRACT

A variety of methods for driving electro-optic displays so as to reduce visible artifacts are described. Such methods includes driving an electro-optic display having a plurality of display pixels and controlled by a display controller, the display controller associated with a host for providing operational instructions to the display controller, the method may include updating the display with a first image, updating the display with a second image subsequent to the first image, processing image data associated with the first image and the second image to identify display pixels with edge artifacts and generate image data associated with the identified pixels, storing the image data associated pixels with edge artifacts at a memory location, and initiating a waveform to clear the edge artifacts.

15 Claims, 6 Drawing Sheets

Related U.S. Application Data continuation-in-part of application No. 16/128,996, filed on Sep. 12, 2018, now Pat. No. 11,423,852.

(60) Provisional application No. 62/620,129, filed on Jan. 22, 2018, provisional application No. 62/557,285, filed on Sep. 12, 2017.

(52) U.S. Cl.
CPC ............... *G09G 2320/0285* (2013.01); *G09G 2320/0295* (2013.01); *G09G 2340/16* (2013.01); *G09G 2360/18* (2013.01)

(58) Field of Classification Search
CPC ................. G09G 3/348; G09G 3/3486; G09G 2310/061; G09G 2320/0257; G09G 2320/0285; G09G 2320/0295; G09G 2340/16; G09G 2360/18
See application file for complete search history.

(56) References Cited

U.S. PATENT DOCUMENTS

| | | | |
|---|---|---|---|
| 5,777,782 | A | 7/1998 | Sheridon |
| 5,808,783 | A | 9/1998 | Crowley |
| 5,872,552 | A | 2/1999 | Gordon, II et al. |
| 5,930,026 | A | 7/1999 | Jacobson et al. |
| 6,054,071 | A | 4/2000 | Mikkelsen, Jr. |
| 6,055,091 | A | 4/2000 | Sheridon et al. |
| 6,097,531 | A | 8/2000 | Sheridon |
| 6,128,124 | A | 10/2000 | Silverman |
| 6,130,774 | A | 10/2000 | Albert et al. |
| 6,137,467 | A | 10/2000 | Sheridon et al. |
| 6,144,361 | A | 11/2000 | Gordon, II et al. |
| 6,147,791 | A | 11/2000 | Sheridon |
| 6,184,856 | B1 | 2/2001 | Gordon, II et al. |
| 6,225,971 | B1 | 5/2001 | Gordon, II et al. |
| 6,241,921 | B1 | 6/2001 | Jacobson et al. |
| 6,271,823 | B1 | 8/2001 | Gordon, II et al. |
| 6,301,038 | B1 | 10/2001 | Fitzmaurice et al. |
| 6,445,489 | B1 | 9/2002 | Jacobson et al. |
| 6,504,524 | B1 | 1/2003 | Gates et al. |
| 6,512,354 | B2 | 1/2003 | Jacobson et al. |
| 6,531,997 | B1 | 3/2003 | Gates et al. |
| 6,672,921 | B1 | 1/2004 | Liang et al. |
| 6,753,999 | B2 | 6/2004 | Zehner et al. |
| 6,788,449 | B2 | 9/2004 | Liang et al. |
| 6,825,970 | B2 | 11/2004 | Goenaga et al. |
| 6,866,760 | B2 | 3/2005 | Paolini, Jr. et al. |
| 6,870,657 | B1 | 3/2005 | Fitzmaurice et al. |
| 6,900,851 | B2 | 5/2005 | Morrison et al. |
| 6,922,276 | B2 | 7/2005 | Zhang et al. |
| 6,950,220 | B2 | 9/2005 | Abramson et al. |
| 6,982,178 | B2 | 1/2006 | LeCain et al. |
| 6,995,550 | B2 | 2/2006 | Jacobson et al. |
| 7,002,728 | B2 | 2/2006 | Pullen et al. |
| 7,012,600 | B2 | 3/2006 | Zehner et al. |
| 7,023,420 | B2 | 4/2006 | Comiskey et al. |
| 7,034,783 | B2 | 4/2006 | Gates et al. |
| 7,061,166 | B2 | 6/2006 | Kuniyasu |
| 7,061,662 | B2 | 6/2006 | Chung et al. |
| 7,072,095 | B2 | 7/2006 | Liang et al. |
| 7,075,502 | B1 | 7/2006 | Drzaic et al. |
| 7,116,318 | B2 | 10/2006 | Amundson et al. |
| 7,116,466 | B2 | 10/2006 | Whitesides et al. |
| 7,119,772 | B2 | 10/2006 | Amundson et al. |
| 7,144,942 | B2 | 12/2006 | Zang et al. |
| 7,170,670 | B2 | 1/2007 | Webber |
| 7,177,066 | B2 | 2/2007 | Chung et al. |
| 7,193,625 | B2 | 3/2007 | Danner et al. |
| 7,202,847 | B2 | 4/2007 | Gates |
| 7,236,291 | B2 | 6/2007 | Kaga et al. |
| 7,259,744 | B2 | 8/2007 | Arango et al. |
| 7,312,784 | B2 | 12/2007 | Baucom et al. |
| 7,312,794 | B2 | 12/2007 | Zehner et al. |
| 7,321,459 | B2 | 1/2008 | Masuda et al. |
| 7,327,511 | B2 | 2/2008 | Whitesides et al. |
| 7,408,699 | B2 | 8/2008 | Wang et al. |
| 7,411,719 | B2 | 8/2008 | Paolini, Jr. et al. |
| 7,420,549 | B2 | 9/2008 | Jacobson et al. |
| 7,453,445 | B2 | 11/2008 | Amundson |
| 7,492,339 | B2 | 2/2009 | Amundson |
| 7,528,822 | B2 | 5/2009 | Amundson et al. |
| 7,535,624 | B2 | 5/2009 | Amundson et al. |
| 7,583,251 | B2 | 9/2009 | Arango et al. |
| 7,602,374 | B2 | 10/2009 | Zehner et al. |
| 7,612,760 | B2 | 11/2009 | Kawai |
| 7,679,599 | B2 | 3/2010 | Kawai |
| 7,679,813 | B2 | 3/2010 | Liang et al. |
| 7,679,814 | B2 | 3/2010 | Paolini, Jr. et al. |
| 7,683,606 | B2 | 3/2010 | Kang et al. |
| 7,688,297 | B2 | 3/2010 | Zehner et al. |
| 7,715,088 | B2 | 5/2010 | Liang et al. |
| 7,733,335 | B2 | 6/2010 | Zehner et al. |
| 7,839,564 | B2 | 11/2010 | Whitesides et al. |
| 7,859,742 | B1 | 12/2010 | Chiu et al. |
| 7,952,557 | B2 | 5/2011 | Amundson |
| 7,956,841 | B2 | 6/2011 | Albert et al. |
| 7,982,479 | B2 | 7/2011 | Wang et al. |
| 7,999,787 | B2 | 8/2011 | Amundson et al. |
| 7,999,832 | B2 | 8/2011 | Burberry et al. |
| 8,009,348 | B2 | 8/2011 | Zehner et al. |
| 8,077,141 | B2 | 12/2011 | Duthaler et al. |
| 8,125,501 | B2 | 2/2012 | Amundson et al. |
| 8,139,050 | B2 | 3/2012 | Jacobson et al. |
| 8,174,490 | B2 | 5/2012 | Whitesides et al. |
| 8,243,013 | B1 | 8/2012 | Sprague et al. |
| 8,274,472 | B1 | 9/2012 | Wang et al. |
| 8,289,250 | B2 | 10/2012 | Zehner et al. |
| 8,294,822 | B2 | 10/2012 | Payson et al. |
| 8,300,006 | B2 | 10/2012 | Zhou et al. |
| 8,314,784 | B2 | 11/2012 | Ohkami et al. |
| 8,373,649 | B2 | 2/2013 | Low et al. |
| 8,384,658 | B2 | 2/2013 | Albert et al. |
| 8,456,414 | B2 | 6/2013 | Lin et al. |
| 8,462,102 | B2 | 6/2013 | Wong et al. |
| 8,514,168 | B2 | 8/2013 | Chung et al. |
| 8,537,105 | B2 | 9/2013 | Chiu et al. |
| 8,558,783 | B2 | 10/2013 | Wilcox et al. |
| 8,558,785 | B2 | 10/2013 | Zehner et al. |
| 8,558,786 | B2 | 10/2013 | Lin |
| 8,558,855 | B2 | 10/2013 | Sprague et al. |
| 8,559,746 | B2 | 10/2013 | Adams |
| 8,576,164 | B2 | 11/2013 | Sprague et al. |
| 8,576,259 | B2 | 11/2013 | Lin et al. |
| 8,605,032 | B2 | 12/2013 | Liu et al. |
| 8,665,206 | B2 | 3/2014 | Lin et al. |
| 8,681,191 | B2 | 3/2014 | Yang et al. |
| 8,711,088 | B2 | 4/2014 | Miyasaka et al. |
| 8,730,153 | B2 | 5/2014 | Sprague et al. |
| 8,810,525 | B2 | 8/2014 | Sprague |
| 8,878,770 | B2 | 11/2014 | Miyazaki et al. |
| 8,928,562 | B2 | 1/2015 | Gates et al. |
| 8,928,641 | B2 | 1/2015 | Chiu et al. |
| 8,976,444 | B2 | 3/2015 | Zhang et al. |
| 9,013,394 | B2 | 4/2015 | Lin |
| 9,019,197 | B2 | 4/2015 | Lin |
| 9,019,198 | B2 | 4/2015 | Lin et al. |
| 9,019,318 | B2 | 4/2015 | Sprague et al. |
| 9,082,352 | B2 | 7/2015 | Cheng et al. |
| 9,171,508 | B2 | 10/2015 | Sprague et al. |
| 9,218,773 | B2 | 12/2015 | Sun et al. |
| 9,224,338 | B2 | 12/2015 | Chan et al. |
| 9,224,342 | B2 | 12/2015 | Sprague et al. |
| 9,224,344 | B2 | 12/2015 | Chung et al. |
| 9,230,492 | B2 | 1/2016 | Harrington et al. |
| 9,251,736 | B2 | 2/2016 | Lin et al. |
| 9,262,973 | B2 | 2/2016 | Wu et al. |
| 9,279,906 | B2 | 3/2016 | Kang |
| 9,299,294 | B2 | 3/2016 | Lin et al. |
| 9,373,289 | B2 | 6/2016 | Sprague et al. |
| 9,390,066 | B2 | 7/2016 | Smith et al. |
| 9,390,661 | B2 | 7/2016 | Chiu et al. |
| 9,460,666 | B2 | 10/2016 | Sprague et al. |

(56) References Cited

U.S. PATENT DOCUMENTS 9,495,918 B2 11/2016 Harrington et al.
9,501,981 B2 11/2016 Lin et al.
9,513,743 B2 12/2016 Sjodin et al.
9,514,667 B2 12/2016 Lin
9,612,502 B2 4/2017 Danner et al.
9,620,048 B2 4/2017 Sim et al.
9,672,766 B2 6/2017 Sjodin
9,691,333 B2 6/2017 Cheng et al.
9,721,495 B2 8/2017 Harrington et al.
9,792,861 B2 10/2017 Chang et al.
9,792,862 B2 10/2017 Hung et al.
9,805,668 B2 10/2017 Agostinelli et al.
9,928,810 B2 3/2018 Harrington
9,966,018 B2 5/2018 Gates et al.
10,002,556 B2 6/2018 Matsuyama et al.
10,163,406 B2 12/2018 Sim et al.
10,229,641 B2 3/2019 Yang et al.
10,319,313 B2 6/2019 Harris et al.
10,339,876 B2 7/2019 Lin et al.
10,444,553 B2 10/2019 Laxton
10,475,396 B2 11/2019 Sim et al.
10,672,350 B2 6/2020 Amundson et al.
11,030,936 B2 6/2021 Emelie et al.
2003/0102858 A1 6/2003 Jacobson et al.
2004/0246562 A1 12/2004 Chung et al.
2005/0253777 A1 11/2005 Zehner et al.
2007/0103427 A1 5/2007 Zhou et al.
2007/0176912 A1 8/2007 Beames et al.
2008/0024429 A1 1/2008 Zehner
2008/0024482 A1 1/2008 Gates et al.
2008/0136774 A1 6/2008 Harris et al.
2008/0303780 A1 12/2008 Sprague et al.
2009/0022229 A1* 1/2009 Sung .................... H04N 21/426 375/E7.014
2009/0174651 A1 7/2009 Jacobson et al.
2009/0322721 A1 12/2009 Zehner et al.
2010/0194733 A1 8/2010 Lin et al.
2010/0194789 A1 8/2010 Lin et al.
2010/0220121 A1 9/2010 Zehner et al.
2010/0265561 A1 10/2010 Gates et al.
2011/0063314 A1 3/2011 Chiu et al.
2011/0175875 A1 7/2011 Lin et al.
2011/0221740 A1 9/2011 Yang et al.
2012/0001957 A1 1/2012 Liu et al.
2012/0098740 A1 4/2012 Chiu et al.
2013/0063333 A1 3/2013 Arango et al.
2013/0194250 A1* 8/2013 Amundson ............ G09G 3/344 345/212
2013/0249782 A1 9/2013 Wu et al.
2014/0085568 A1 3/2014 Li et al.
2014/0204012 A1 7/2014 Wu et al.
2014/0240210 A1 8/2014 Wu et al.
2014/0253425 A1 9/2014 Zalesky et al.
2014/0293398 A1 10/2014 Wang et al.
2015/0005720 A1 1/2015 Zang et al.
2015/0262255 A1 9/2015 Khajehnouri et al.
2016/0012710 A1 1/2016 Lu et al.
2016/0055787 A1* 2/2016 Matsuyama ........... G09G 3/344 345/691
2016/0133196 A1 5/2016 Emelie et al.
2016/0180777 A1 6/2016 Lin et al.
2016/0225322 A1* 8/2016 Sim ........................ G09G 3/344
2016/0314733 A1 10/2016 Crounse
2017/0178573 A1 6/2017 Hsiang

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4 4 (2001).

Korean Intellectual Property Office, PCT/US2019/014485, International Search Report and Written Opinion, dated May 8, 2019.

European Patent Office, "Extended European Search Report", EP Appl. No. 19741516.9, dated Jul. 15, 2021.

* cited by examiner

ELECTRO-OPTIC DISPLAYS, AND METHODS FOR DRIVING SAME

CROSS-REFERENCE TO RELATED APPLICATIONS

This application is a continuation of U.S. application Ser. No. 16/253,609, filed Jan. 22, 2019 (Publication No. 2019-0172401), which claims priority to U.S. Provisional Patent Application No. 62/620,129, filed Jan. 22, 2018 and is a continuation-in-part of U.S. application Ser. No. 16/128,996, filed Sep. 12, 2018, now U.S. Pat. No. 11,423,852, which claims priority to U.S. Provisional Patent Application No. 62/557,285, filed Sep. 12, 2017. The entire disclosures of the aforementioned applications, and of all patents, applications, and publications referred to below, are also herein incorporated by reference.

FIELD OF THE INVENTION

This invention relates to methods for driving electro-optic displays. More specifically, this invention relates to driving methods for reducing pixel edge artifacts and/or image retentions in electro-optic displays.

BACKGROUND OF THE INVENTION

Electro-optic displays typically have a backplane provided with a plurality of pixel electrodes each of which defines one pixel of the display; conventionally, a single common electrode extending over a large number of pixels, and normally the whole display is provided on the opposed side of the electro-optic medium. The individual pixel electrodes may be driven directly (i.e., a separate conductor may be provided to each pixel electrode) or the pixel electrodes may be driven in an active matrix manner which will be familiar to those skilled in backplane technology. Since adjacent pixel electrodes will often be at different voltages, they must be separated by inter-pixel gaps of finite width in order to avoid electrical shorting between electrodes. Although at first glance it might appear that the electro-optic medium overlying these gaps would not switch when drive voltages are applied to the pixel electrodes (and indeed, this is often the case with some non-bistable electro-optic media, such as liquid crystals, where a black mask is typically provided to hide these non-switching gaps), in the case of many bistable electro-optic media the medium overlying the gap does switch because of a phenomenon known as "blooming."

Blooming refers to the tendency for application of a drive voltage to a pixel electrode to cause a change in the optical state of the electro-optic medium over an area larger than the physical size of the pixel electrode. Although excessive blooming should be avoided (for example, in a high resolution active matrix display one does not wish application of a drive voltage to a single pixel to cause switching over an area covering several adjacent pixels, since this would reduce the effective resolution of the display) a controlled amount of blooming is often useful. For example, consider a black-on-white electro-optic display which displays numbers using a conventional seven-segment array of seven directly driven pixel electrodes for each digit. When, for example, a zero is displayed, six segments are turned black. In the absence of blooming, the six inter-pixel gaps will be visible. However, by providing a controlled amount of blooming, for example as described in the aforementioned 2005/0062714, the inter-pixel gaps can be made to turn black, resulting in a more visually pleasing digit. However, blooming can lead to a problem denoted "edge ghosting."

An area of blooming is not a uniform white or black but is typically a transition zone where, as one moves across the area of blooming, the color of the medium transitions from white through various shades of gray to black. Accordingly, an edge ghost will typically be an area of varying shades of gray rather than a uniform gray area, but can still be visible and objectionable, especially since the human eye is well equipped to detect areas of gray in monochrome images where each pixel is supposed to be pure black or pure white.)

In some cases, asymmetric blooming may contribute to edge ghosting. "Asymmetric blooming" refers to a phenomenon whereby in some electro-optic media (for example, the copper chromite/titania encapsulated electrophoretic media described in U.S. Pat. No. 7,002,728) the blooming is "asymmetric" in the sense that more blooming occurs during a transition from one extreme optical state of a pixel to the other extreme optical state than during a transition in the reverse direction; in the media described in this patent, typically the blooming during a black-to-white transition is greater than that during a white-to-black one.

As such, driving methods that can reduce ghosting or blooming effects are desired.

SUMMARY OF THE INVENTION

Accordingly, in one aspect, a method for driving an electro-optic display having a plurality of display pixels and controlled by a display controller, the display controller associated with a host for providing operational instructions to the display controller, the method may include updating the display with a first image, updating the display with a second image subsequent to the first image, processing image data associated with the first image and the second image to identify display pixels with edge artifacts and generate image data associated with the identified pixels, storing the image data associated pixels with edge artifacts at a memory location, and initiating a waveform to clear the edge artifacts.

In another embodiment, the subject matter presented herein provides for a method for driving an electro-optic display having a plurality of display pixels. The method including updating the display with a first image, identifying display pixels with edge artifacts after the first image update, applying waveforms designed to remove artifacts to the identified pixels, and updating another image to the display. In some embodiments, the method may also include determining display pixel gray tone transitions between the first image and the second image. In some other embodiments, the method may include determining displays pixels having different gray tones than at least one of its cardinal neighboring pixels, and flagging the identified pixels in a memory associated with the display's controller.

DETAILED DESCRIPTION OF THE INVENTION

Figure 1:
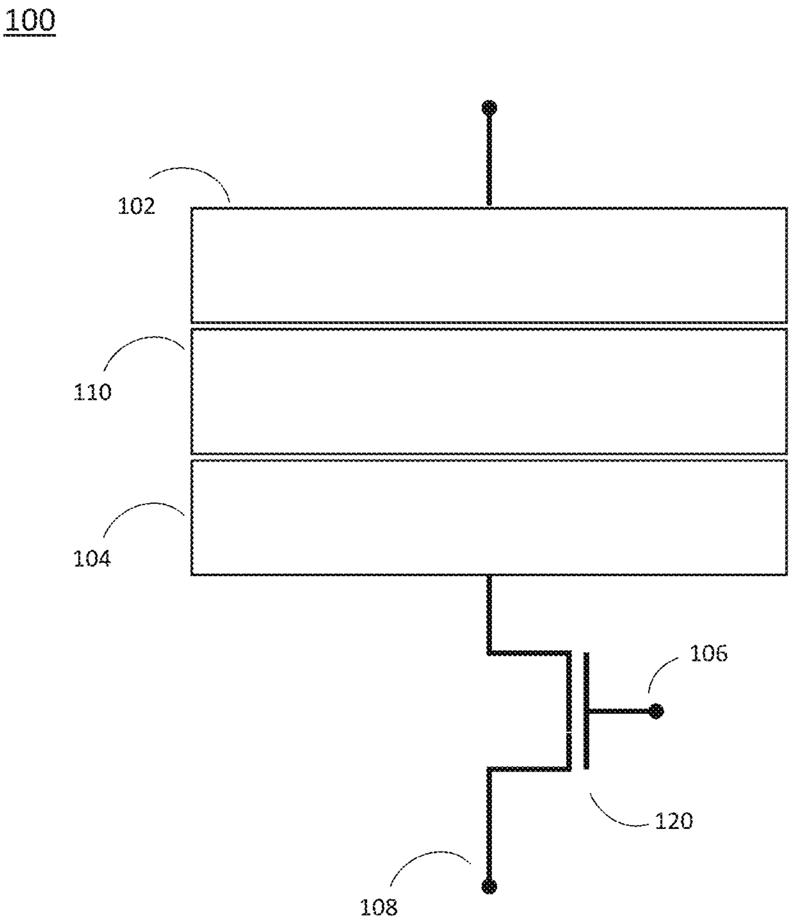
FIG. 1 illustrates a circuit diagram representing an electrophoretic display.

The present invention relates to methods for driving electro-optic displays, especially bistable electro-optic displays, and to apparatus for use in such methods. More specifically, this invention relates to driving methods which may allow for reduced "ghosting" and edge effects, and reduced flashing in such displays. This invention is especially, but not exclusively, intended for use with particle-based electrophoretic displays in which one or more types of electrically charged particles are present in a fluid and are moved through the fluid under the influence of an electric field to change the appearance of the display.

The term "electro-optic" as applied to a material or a display is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence, or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example, the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays." Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses." The term "drive scheme" denotes a set of waveforms sufficient to effect all possible transitions between gray levels for a specific display. A display may make use of more than one drive scheme; for example, the aforementioned U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Several types of electro-optic displays are known. One type of electro-optic display is a rotating bichromal member type as described, for example, in U.S. Pat. Nos. 5,808,783; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting," Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display," IDW Japan, 2001, Paper HCS1-1, and Yamaguchi, Y., et al., "Toner display using insulative particles charged triboelectrically," IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564.

(h) Applications of displays; see for example U.S. Pat. Nos. 7,312,784; 8,009,348;

(i) Non-electrophoretic displays, as described in U.S. Pat. No. 6,241,921 and U.S. Patent Application Publication No. 2015/0277160; and applications of encapsulation and microcell technology other than displays; see for example U.S. Patent Application Publications Nos. 2015/0005720 and 2016/0012710; and (j) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/

0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2016/0071465; 2016/0078820; 2016/0093253; 2016/0140910; and 2016/0180777.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Publication No. 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display." In a microcell electrophoretic display, the charged particles and the suspending fluid are not encapsulated within microcapsules but instead are retained within a plurality of cavities formed within a carrier medium, e.g., a polymeric film. See, for example, International Application Publication No. WO 02/01281, and published U.S. Application No. 2002/0075556, both assigned to Sipix Imaging, Inc.

Many of the aforementioned E Ink and MIT patents and applications also contemplate microcell electrophoretic displays and polymer-dispersed electrophoretic displays. The term "encapsulated electrophoretic displays" can refer to all such display types, which may also be described collectively as "microcavity electrophoretic displays" to generalize across the morphology of the walls.

Another type of electro-optic display is an electro-wetting display developed by Philips and described in Hayes, R. A., et al., "Video-Speed Electronic Paper Based on Electrowetting," Nature, 425, 383-385 (2003). It is shown in copending application Ser. No. 10/711,802, filed Oct. 6, 2004, that such electro-wetting displays can be made bistable.

Other types of electro-optic materials may also be used. Of particular interest, bistable ferroelectric liquid crystal displays (FLCs) are known in the art and have exhibited remnant voltage behavior.

Although electrophoretic media may be opaque (since, for example, in many electrophoretic media, the particles substantially block transmission of visible light through the display) and operate in a reflective mode, some electrophoretic displays can be made to operate in a so-called "shutter mode" in which one display state is substantially opaque and one is light-transmissive. See, for example, the patents U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

A high-resolution display may include individual pixels which are addressable without interference from adjacent pixels. One way to obtain such pixels is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. When the non-linear element is a transistor, the pixel electrode may be connected to the drain of the transistor, and this arrangement will be assumed in the following description, although it is essentially arbitrary and the pixel electrode could be connected to the source of the transistor. In high-resolution arrays, the pixels may be arranged in a two-dimensional array of rows and columns, such that any specific pixel is uniquely defined by the intersection of one specified row and one specified column. The sources of all the transistors in each column may be connected to a single column electrode, while the gates of all the transistors in each row may be connected to a single row electrode; again the assignment of sources to rows and gates to columns may be reversed if desired.

The display may be written in a row-by-row manner. The row electrodes are connected to a row driver, which may apply to a selected row electrode a voltage such as to ensure that all the transistors in the selected row are conductive, while applying to all other rows a voltage such as to ensure that all the transistors in these non-selected rows remain non-conductive. The column electrodes are connected to column drivers, which place upon the various column electrodes voltages selected to drive the pixels in a selected row to their desired optical states. (The aforementioned voltages are relative to a common front electrode which may be provided on the opposed side of the electro-optic medium from the non-linear array and extends across the whole display. As in known in the art, voltage is relative and a measure of a charge differential between two points. One voltage value is relative to another voltage value. For example, zero voltage ("0V") refers to having no voltage differential relative to another voltage.) After a pre-selected interval known as the "line address time," a selected row is deselected, another row is selected, and the voltages on the column drivers are changed so that the next line of the display is written.

However, in use, certain waveforms may produce a remnant voltage to pixels of an electro-optic display, and as evident from the discussion above, this remnant voltage produces several unwanted optical effects and is in general undesirable.

As presented herein, a "shift" in the optical state associated with an addressing pulse refers to a situation in which a first application of a particular addressing pulse to an electro-optic display results in a first optical state (e.g., a first gray tone), and a subsequent application of the same addressing pulse to the electro-optic display results in a second optical state (e.g., a second gray tone). Remnant voltages may give rise to shifts in the optical state because the voltage applied to a pixel of the electro-optic display during application of an addressing pulse includes the sum of the remnant voltage and the voltage of the addressing pulse.

A "drift" in the optical state of a display over time refers to a situation in which the optical state of an electro-optic display changes while the display is at rest (e.g., during a period in which an addressing pulse is not applied to the display). Remnant voltages may give rise to drifts in the optical state because the optical state of a pixel may depend on the pixel's remnant voltage, and a pixel's remnant voltage may decay over time.

As discussed above, "ghosting" refers to a situation in which, after the electro-optic display has been rewritten, traces of the previous image(s) are still visible. Remnant voltages may give rise to "edge ghosting," a type of ghosting in which an outline (edge) of a portion of a previous image remains visible.

An Exemplary EPD

FIG. 1 shows a schematic of a pixel 100 of an electro-optic display in accordance with the subject matter submitted herein. Pixel 100 may include an imaging film 110. In some embodiments, imaging film 110 may be bistable. In some embodiments, imaging film 110 may include, without limitation, an encapsulated electrophoretic imaging film, which may include, for example, charged pigment particles.

Imaging film 110 may be disposed between a front electrode 102 and a rear electrode 104. Front electrode 102 may be formed between the imaging film and the front of the display. In some embodiments, front electrode 102 may be transparent. In some embodiments, front electrode 102 may be formed of any suitable transparent material, including, without limitation, indium tin oxide (ITO). Rear electrode 104 may be formed opposite a front electrode 102. In some embodiments, a parasitic capacitance (not shown) may be formed between front electrode 102 and rear electrode 104.

Pixel 100 may be one of a plurality of pixels. The plurality of pixels may be arranged in a two-dimensional array of rows and columns to form a matrix, such that any specific pixel is uniquely defined by the intersection of one specified row and one specified column. In some embodiments, the matrix of pixels may be an "active matrix," in which each pixel is associated with at least one non-linear circuit element 120. The non-linear circuit element 120 may be coupled between back-plate electrode 104 and an addressing electrode 108. In some embodiments, non-linear element 120 may include a diode and/or a transistor, including, without limitation, a MOSFET. The drain (or source) of the MOSFET may be coupled to back-plate electrode 104, the source (or drain) of the MOSFET may be coupled to addressing electrode 108, and the gate of the MOSFET may be coupled to a driver electrode 106 configured to control the activation and deactivation of the MOSFET. (For simplicity, the terminal of the MOSFET coupled to back-plate electrode 104 will be referred to as the MOSFET's drain, and the terminal of the MOSFET coupled to addressing electrode 108 will be referred to as the MOSFET's source. However, one of ordinary skill in the art will recognize that, in some embodiments, the source and drain of the MOSFET may be interchanged.)

In some embodiments of the active matrix, the addressing electrodes 108 of all the pixels in each column may be connected to a same column electrode, and the driver electrodes 106 of all the pixels in each row may be connected to a same row electrode. The row electrodes may be connected to a row driver, which may select one or more rows of pixels by applying to the selected row electrodes a voltage sufficient to activate the non-linear elements 120 of all the pixels 100 in the selected row(s). The column electrodes may be connected to column drivers, which may place upon the addressing electrode 106 of a selected (activated) pixel a voltage suitable for driving the pixel into a desired optical state. The voltage applied to an addressing electrode 108 may be relative to the voltage applied to the pixel's front-plate electrode 102 (e.g., a voltage of approximately zero volts). In some embodiments, the front-plate electrodes 102 of all the pixels in the active matrix may be coupled to a common electrode.

In some embodiments, the pixels 100 of the active matrix may be written in a row-by-row manner. For example, a row of pixels may be selected by the row driver, and the voltages corresponding to the desired optical states for the row of pixels may be applied to the pixels by the column drivers. After a pre-selected interval known as the "line address time," the selected row may be deselected, another row may be selected, and the voltages on the column drivers may be changed so that another line of the display is written.

Figure 2:
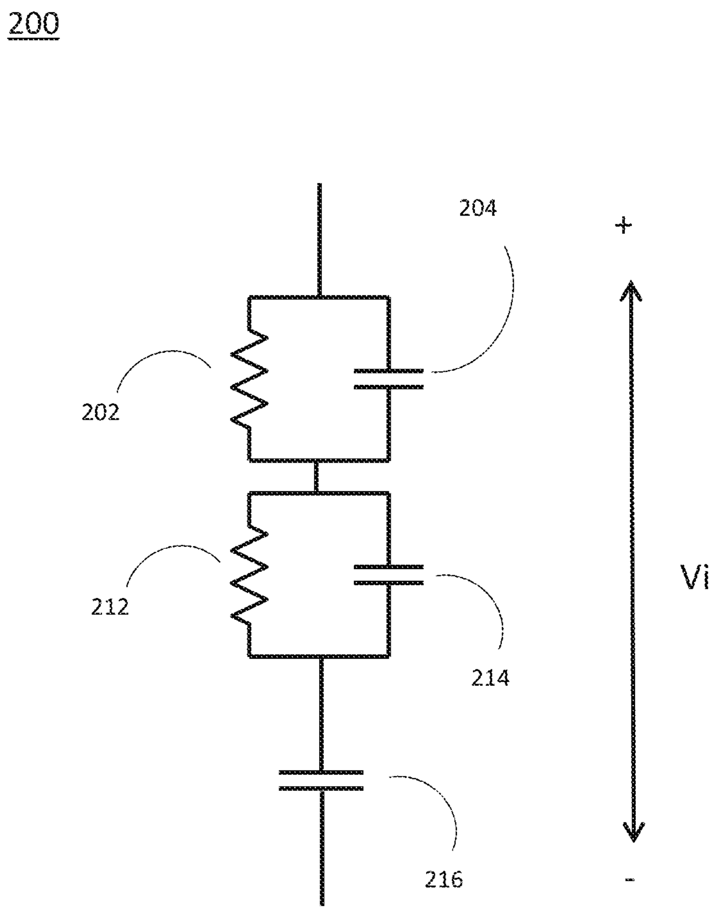
FIG. 2 illustrates a circuit model of the electro-optic imaging layer.

FIG. 2 shows a circuit model of the electro-optic imaging layer 110 disposed between the front electrode 102 and the rear electrode 104 in accordance with the subject matter presented herein. Resistor 202 and capacitor 204 may represent the resistance and capacitance of the electro-optic imaging layer 110, the front electrode 102 and the rear electrode 104, including any adhesive layers. Resistor 212 and capacitor 214 may represent the resistance and capacitance of a lamination adhesive layer. Capacitor 216 may represent a capacitance that may form between the front electrode 102 and the back electrode 104, for example, interfacial contact areas between layers, such as the interface between the imaging layer and the lamination adhesive layer and/or between the lamination adhesive layer and the backplane electrode. A voltage Vi across a pixel's imaging film 110 may include the pixel's remnant voltage.

Detecting and reducing or removing edge artifacts and ghosting in an electro-optic display described above will likely require additional image data processing, the detection and clearing methods described in U.S. Patent Publication No. 2013/0194250 A1 to Amundson et al., ("Amundson") and U.S. Patent Publication No. 2016/0225322 A1 to Sim et al., ("Sim") are some image data processing methods that may be adopted, all of which are incorporated herein in their entireties. However, such image data processing methods and also the clearing of the edge artifacts and pixel ghosting may require processing time of their own, which may not always be available. As such, in a rapidly paced updating waveform mode, such as the Direct Update waveform mode described below, it may be desirable to perform the image data processing concurrently with the image data updating process. In addition, edge artifact and pixel ghosting clearing may be triggered and performed only when desired.

Direct Update or DUDS

In some applications, a display may make use of a rapidly paced updating waveform mode such as a "direct update" waveform mode ("DUDS"). The DUDS may have two or more than two gray levels, typically fewer than a gray scale drive scheme ("GSDS"), which can effect transitions between all possible gray levels, but the most important characteristic of a DUDS is that transitions are handled by a simple unidirectional drive from the initial gray level to the final gray level, as opposed to the "indirect" transitions often used in a GSDS, where in at least some transitions the pixel is driven from an initial gray level to one extreme optical state, then in the reverse direction to a final gray level; in some cases, the transition may be effected by driving from the initial gray level to one extreme optical state, thence to the opposed extreme optical state, and only then to the final extreme optical state—see, for example, the drive scheme illustrated in FIGS. 11A and 11B of the aforementioned U.S. Pat. No. 7,012,600. Thus, present electrophoretic displays may have an update time in grayscale mode of about two to three times the length of a saturation pulse (where "the length of a saturation pulse" is defined as the time period, at a specific voltage, that suffices to drive a pixel of a display from one extreme optical state to the other), or approximately 700-900 milliseconds, whereas a DUDS has a maximum update time equal to the length of the saturation pulse, or about 200-300 milliseconds.

It should be appreciated that the Direct Update (DU) waveform mode or driving scheme described above is used herein to explain the general working principles of the subject matter disclosed herein. It is not meant to serve as a limitation to the current subject matter. As these working principles can be easily applied to other waveform modes or schemes.

The DU waveform mode is a driving scheme that usually considers updates to white and black with empty self-transitions. The DU mode would have a short update time to bring up black and white quickly, with minimal appearance of a "flashy" transition, where the display would appear to be blinking on and off and may be visually unattractive to some viewer's eyes. The DU mode may sometimes be used to bring up menus, progress bars, keyboards etc. on a display screen. Because both the white to white and black to black transitions are null (i.e., un-driven) in the DU mode, edge artifacts may arise in the black and white backgrounds.

As described above, when an un-driven pixel lies adjacent a pixel which is being updated, a phenomenon known as "blooming" occurs, in which the driving of the driven pixel causes a change in optical state over an area slightly larger than that of the driven pixel, and this area intrudes into the area of adjacent pixels. Such blooming manifests itself as edge effects along the edges where the un-driven pixels lie adjacent driven pixels. Similar edge effects occur when using regional updates (where only a particular region of the display is updated, for example to show an image), except that with regional updates the edge effects occur at the boundary of the region being updated. Over time, such edge effects become visually distracting and must be cleared. Hitherto, such edge effects (and the effects of color drift in un-driven white pixels) have typically been removed by using a single Global Clearing or GC update at intervals. Unfortunately, use of such an occasional GC update may reintroduces the problem of a "flashy" update, and indeed the flashiness of the update may be heightened by the fact that the flashy update only occurs at long intervals.

Concurrent Image Updating and Edge Artifacts Data Processing

In comparison, some of the display pixel edge artifacts reduction methods may result in additional latency due to image processing designed to detect and remove edge artifacts after each image update. In addition, the use of the DC imbalanced waveforms in these reduction methods would not be feasible since the small dwell time in between updates (such as the DU mode presented above) does not allow sufficient time to perform post drive discharging. And without post drive discharging, there is a potential risk to overall optical performance and module reliability.

Alternatively, in some embodiments, image data processing such as the ones described in Amundson and Sim may be ran concurrently with the image updating process. For example, as the display 100 is updating a first image, image data of the first and a subsequent second image may be processed to identify pixels that may develop edge artifacts or other undesired optical defects. Subsequently, such data may be saved into a buffer memory for an edge artifact clearing process to be performed at a later time. In some embodiments, this data processing of the images can occur when subsequent images are being fed to the EPDC. In some other embodiments, where which images are to be updated to the display is known, this data process of the images may occur before subsequent images are updated.

One method to keep track of or generate and save this edge artifacts information as an electro-optic display goes through optical changes is to generate a map, where this map may include information such as which pixel within an the display will likely to develop edge artifacts. One such method is described in U.S. patent application Ser. No. 16/128,996 to Sim et al., which is incorporated herein in its entirety.

For example, in some embodiments, pixel edge artifacts generated under a drive scheme or waveform modes may be stored in a memory (e.g., a binary map), for example, each display pixel may be represented by a designator MAP (i, j), and pixels that may develop edge artifacts may be flagged and their map information (i.e., the MAP (i, j) designator) may be saved in a binary map. Illustrated below is one approach that may be used to keep track of generated edge artifacts on the map and flag such pixels:

```
MAP (i, j) = 0 forall i, j;
For all DU update in sequential order
  For all pixels (i, j) in any order:
    If the pixel graytone transition is White→White, AND
      all four cardinal neighbors have a next graytone of
      white, AND with at least one cardinal neighbor has a
      current graytone not white AND all neighbors of MAP (i, j )
      is 0, then MAP (i, j) = 1.
    Else, if the pixel graytone transition is Black→Black, AND
      at least one cardinal neighbor has a current graytone not
      black AND a next graytone of black AND all neighbors of
      MAP (i, j) is 0, then MAP (i, j) = 2.
    End
  End
End
```

In this approach, when certain conditions are met, a display pixel designated MAP (i, j) may be flagged with a numerical value of 1, indicating that dark edge artifacts have formed on this pixel. Some of the conditions required may include (1). this display pixel is going through a white to white transition; (2). all four cardinal neighbors (i.e., the four closest neighboring pixels) have a next graytone of white; AND (3). at least one cardinal neighbor has a current graytone that is not white; and (4). none of the neighboring pixels (i.e., the four cardinal neighbors and also the diagonal neighbors) are currently flagged for edge artifacts.

Similarly, when certain conditions are met, a display pixel MAP (i, j) may be flagged with a numerical value of 2, indicating that white edges have formed on this pixel. Some of the conditions required may include (1). this pixel is going through a black to black transition; (2). at least one cardinal neighbor has a current graytone that is not black and its next graytone is black; and (3). none of the neighboring pixels (i.e., the four cardinal neighbors and also the diagonal neighbors) are currently flagged for edge artifacts.

In use, one advantage of this approach is that the above mentioned image processing (i.e., map generation and pixel flagging) can occur concurrently with the display image updating cycles, thereby avoiding the creation of extra latencies to the updating cycles, due at least in part to the reason that the generated map is only required at the completion of the update cycle.

Once an update mode has completed (e.g., the display ceases from using a particular update mode), pixel information accumulated by the generated map may be later used for clearing the edge artifacts (e.g., using an out waveform mode). For example, pixels flagged for edge artifacts may be cleared with a low flash waveform with specialized waveforms.

In some embodiments, full clearing white to white and black to black waveforms in conjunction with special edge clearing white to white and black to black waveforms may be used to clear the edge artifacts. For example, balanced pulse pairs described in U.S. patent application Ser. No. 2013/0194250, which is incorporated in its entirety herein, describes:

```
For all pixels (i, j) in any order
   If the pixel graytone transition is not White→White and not
Black→Black, invoke the normal DU_OUT transition
   Else, if MAP (i, j) is 1 and pixel graytone transition is
White→White, apply a special full white to white waveform
   Else, if the pixel graytone transition is White→White, AND at
least one cardinal neighbor has MAP (i, j) is 1, apply the special edge
erasing white to white waveform.
   Else, if MAP (i, j)==2 and pixel graytone transition is
Black→Black, apply a special full black to black waveform.
   Else, if the pixel graytone transition is Black→Black, AND at
least one cardinal neighbor has MAP (i, j) is 2, apply the special edge
erasing black to black waveform.
   Otherwise invoke the Black→Black/White→White transition of the
DU_OUT waveform table.
   End
End
```

Figure 3A:
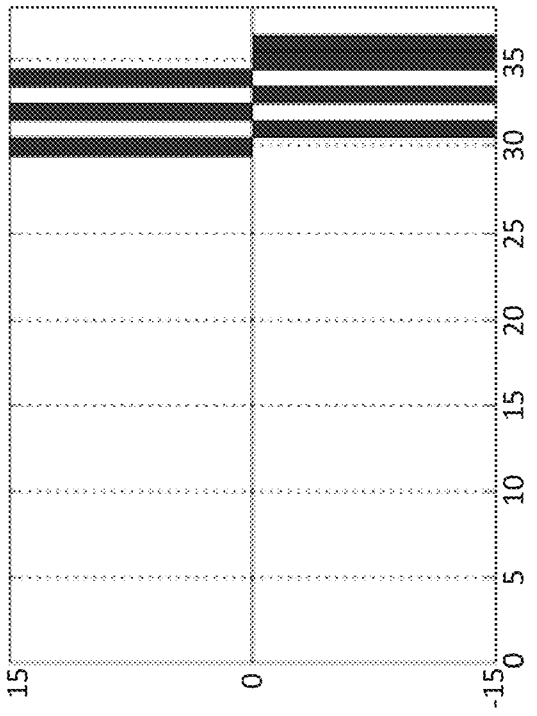
FIG. 3*a* illustrates an exemplary special pulse pair edge erasing waveform for pixels going through a white to white transition.
Figure 3C:
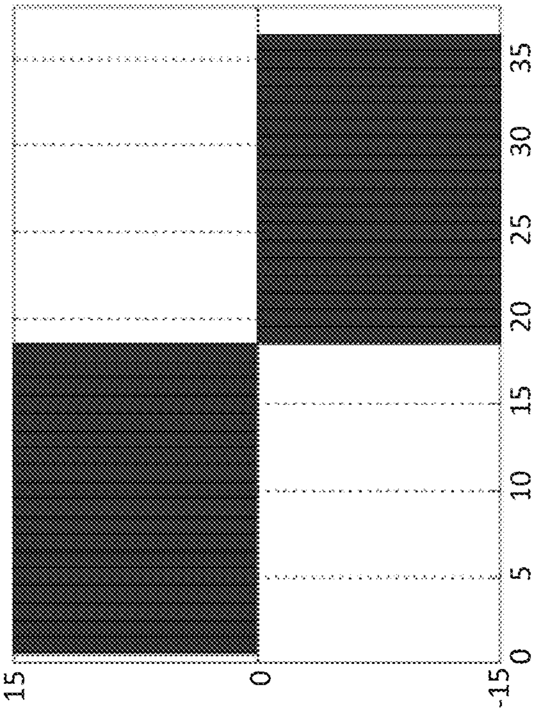
FIG. 3*c* illustrates an exemplary special full white to white driving waveform.
Figure 4A:
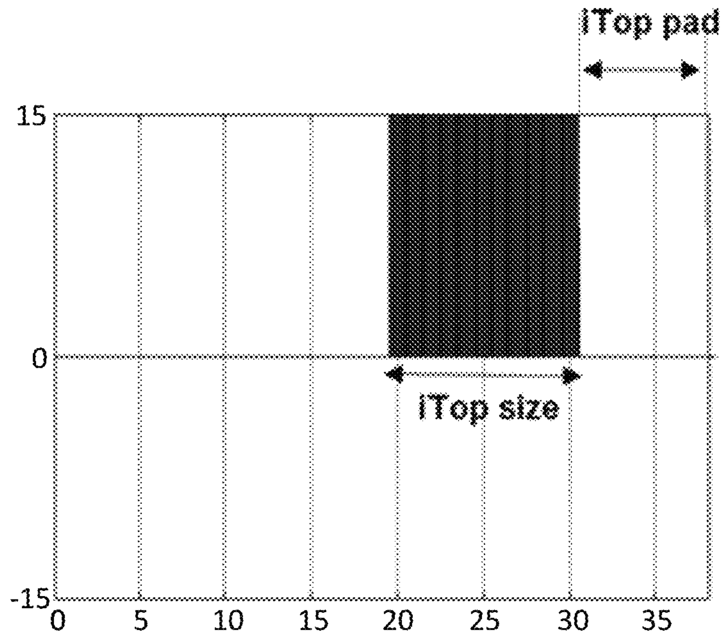
FIG. 4*a* illustrates an exemplary special edge erasing waveform for pixels going through a black to black transition.
Figure 4B:
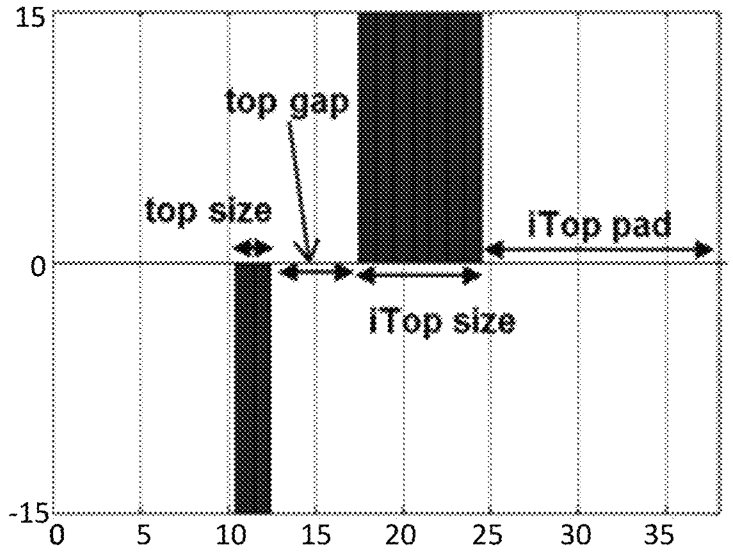
FIG. 4*b* illustrates an exemplary special full black to black driving waveform.

In this approach, a DU_OUT transition scheme (e.g., a modified DU scheme with the edge artifact reduction algorithm included) may be applied to pixels that is not going through a white to white or black to black transition, for example, these pixels may receive the normal transition updates as if they were under a normal DU drive scheme. Else, for a pixel with dark edge artifacts (i.e., MAP (i, j)=1) and going through a white to white transition, a special full white to white waveform may be applied. In some embodiments, this white to white waveform may be a waveform similar to what is illustrated in FIG. 3*c*, which may be substantially DC balanced, meaning, the sum of the voltage bias apply as a function of magnitude and time is substantially zero overall; otherwise, if a pixel is going through a white to white transition, and at least one cardinal neighbor has dark edge artifact (i.e., MAP (i, j)=1), a special edge erasing white to white waveform is applied (e.g., FIG. 3*a*); still more, if a pixel had white edge artifact (i.e., MAP (i, j)=2) and is going through a black to black transition, a special full black to black waveform, as illustrated in FIG. 4*b*, may be applied; still more, if a pixel is going through a black to black transition, AND at least one cardinal neighbor is flagged for white edge artifact (i.e., MAP (i, j)=2), apply a special edge erasing black to black waveform, as illustrated in FIG. 4*a*; otherwise, apply the black to black or white to white transition waveforms to all other pixels using waveforms from the DU-OUT waveform table.

Using the above mentioned method, full clearing white to white and black to black waveforms are used in conjunction with special edge clearing white to white and black to black waveforms to clear the edge artifacts. In some embodiments, the special edge clearing white to white waveform can take the form of a pulse pair as described in U.S. Patent Publication No. 2013/0194250 to Amundson et al., which is incorporated herein in its entirety, or a DC imbalance pulse drive to white as given in illustrated in FIG. 3*b*, in which case post drive discharge described in may be used to discharge remnant voltages and reduce device stresses. Similarly, a DC imbalanced pulse, as illustrated in FIG. 4*a*, may be used to drive a pixel to black, in which case, again, a post drive discharge may be performed. As illustrated in FIG. 4, such a DC imbalanced pulse is only driven to positive 15 volts for a period of time. In this configuration, excellent edge clearing performance can be achieved at the cost of small transition appearance imperfections (e.g., flashes) due to the use of the special full clearing waveform.

In another embodiment, transition appearance imperfections (e.g., flashes) may be reduced using an alternative implementation described below:

```
For all pixels (i, j) in any order
   If the pixel graytone transition is not White→White and not
Black→Black, invoke the normal DU_OUT transition
   Else, if MAP (i, j) is 1 and pixel graytone transition is
White→White, apply a DC imbalance drive pulse to white.
   Else, if MAP (i, j) ==2 and pixel graytone transition is
Black→Black, apply a DC imbalance drive to black.
   Otherwise invoke the Black→Black/White→White transition
of the DU_OUT waveform table.
   End
End
```

In this approach, instead of using specialized edge clearing waveforms as described in the first method above, DC imbalanced waveforms may be used to clear the edge artifacts. In some instances, post drive discharges may be used to reduce hardware stress due to the imbalanced waveforms. In use, when a display pixel is not going through either a white to white or black to black transition, a normal DU-OUT transition is applied to the pixel. Else, if a display pixel is identified of having dark edge artifacts (i.e., MAP (i, j)=1) and is going through a white to white transition, a DC imbalanced drive pulse is used to drive the pixel to white (e.g., a pulse similar to that illustrated in FIG. 3*b*); else, if a display pixel is identified of having white edge artifacts (i.e., MAP (i, j)=2) and is going through a black to black transition, a DC imbalanced drive pulse (e.g., a pulse similar to that illustrated in FIG. 4*a*) is applied to drive the pixel to black; otherwise, invoke the black to black or white to white transitions of the DU-OUT waveform table to the display pixels.

In yet another embodiment, instead of storing edge artifact information in a designated memory location, one may bring forward the edge artifact information in an image buffer associated with the display's controller unit (EPDC) (e.g., using a next image buffer associated with the controller unit).

```
For all DU update in sequential order
      For all pixels (i,j) in any order:
            If the pixel graytone transition is White→White, AND all
      four cardinal neighbors have a next graytone of white, AND
      with at least one cardinal neighbor has a current graytone not
      white then set next graytone to special white to white image
      state.
            Else, if the pixel graytone transition is Black→Black,
      AND at least one cardinal neighbor has a current graytone not
      black AND a next graytone of black then set next graytone to
      special black to black image state.
            End
      End
End
```

In this approach, for a pixel going through a white to white transition and all of its four cardinal neighbors having a next graytone of white, if at least one of the cardinal neighbor's current graytone is not white, then set the pixel's next graytone to a special white to white image state in the next image buffer; else, if a pixel's graytone transition is black to black, and at least one cardinal neighbor has a current graytone that is not black and a next graytone that is black, then the pixel's next graytone is set to a special black to black image state in the next image buffer. In use, during an update cycle the special white to white and special black to black image states can be the same as the white to white and black to black image states for both application of the waveform transition and for image processing. For the application of waveform transition, this means that:

special white state→white state (i.e., white state to white state) is equivalent to white state→white state (i.e., white state to white state) of the waveform look-up table special white state→any gray states (i.e., white state to any gray state) is equivalent to white state→any gray states (i.e., white state to any gray state) of the waveform look-up table, etc.

special black state→black state (i.e., black state to black state) is equivalent to black state→black state (i.e., black state to black state) of the waveform look-up table special black state→any gray states (i.e., black state to any gray state) is equivalent to black state→any gray states (i.e., black state to any gray state) of the waveform look-up table, etc.

Figure 3B:
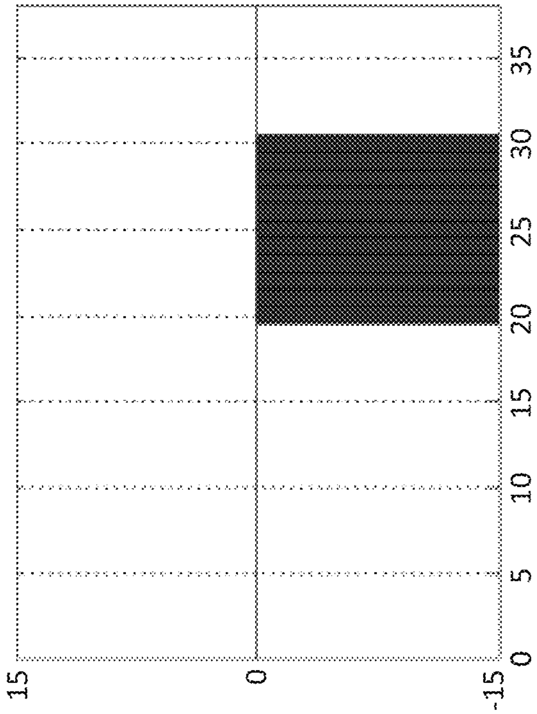
FIG. 3*b* illustrates an exemplary special DC imbalanced pulse to erase white edges for pixels going through a white to white transition.

During the out mode, the special white state to white state received the DC imbalance pulse to white (e.g., FIG. 3*b* illustrates an exemplary such pulse) and the special black state to black state received the DC imbalance pulse to black (e.g., FIG. 4*a* illustrates an exemplary such pulse). The imaging algorithm processing occurs in the background during the DU mode updating, meaning the DU updating time can be used to process the images.

Figure 5B:
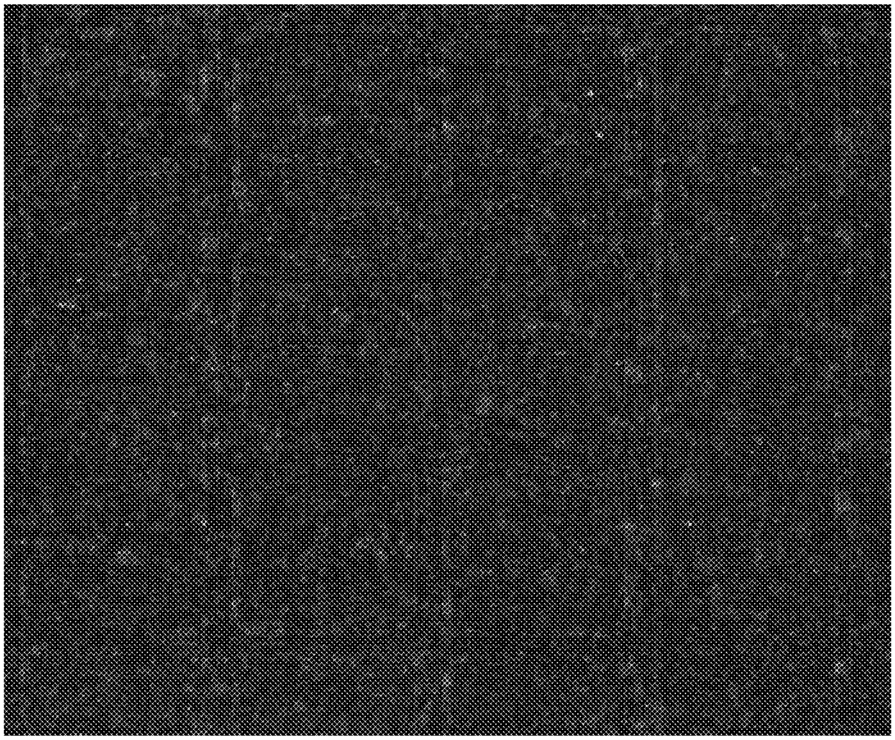
FIG. 5*b* illustrates another screen shot of a display with blooming or ghost effect reduction applied in accordance with the subject matter presented herein.
Figure 5A:
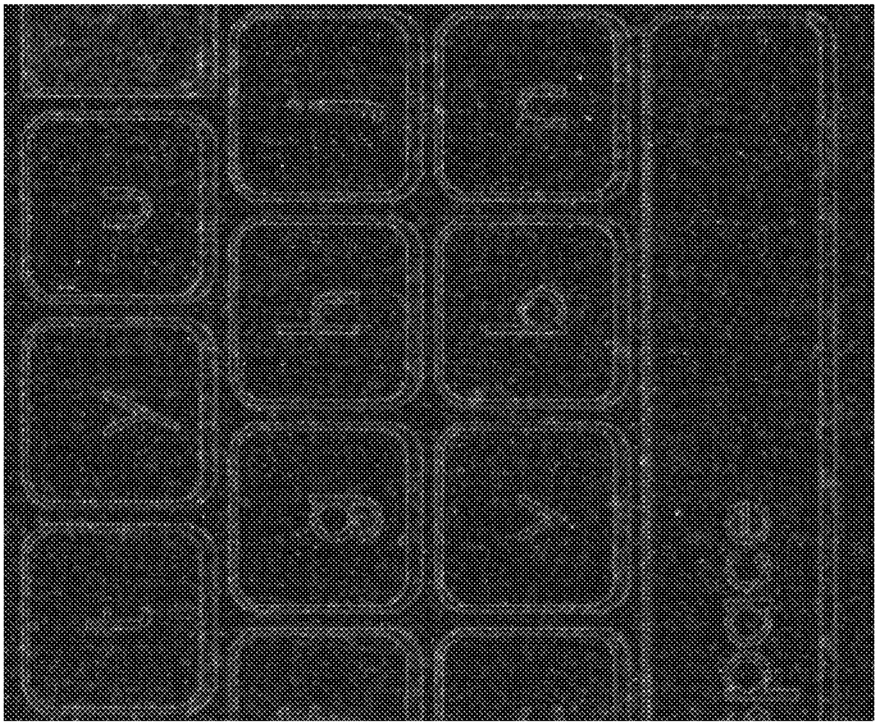
FIG. 5*a* illustrates a screen shot of a display with blooming or ghosting effect.

FIG. 5*a* and FIG. 5*b* illustrate displays without and with edge artifacts reduction applied. In practice, where edge artifacts reduction is not applied, white edges on a black background is clearly visible, as shown in FIG. 5*a*. In contrast, FIG. 5*b* shows that the white edges are cleared using one of the proposed methods presented herein.

In some embodiments, pixels with edge artifacts or may potentially develop edge artifacts may be flagged as described above and stored at a memory location different from a memory buffer used for image updating. For example, at a memory physically separate from the buffer memory used for image updating. However, in some cases, it may be desirable to reduce the amount of memory used. As such, in some embodiments, a memory used for image updating (e.g., image updating buffer memory) may be used to also store the cumulative edge artifacts information. For example, while an electro-optic display is going through optical changes (e.g., image updates), instead of generating a map with all the pixels, individual pixels may be associated with an indicator designed for indicating if a particular pixel has edge artifacts. This indicator can be used to indicate if a particular pixel is flagged for edge artifacts. As the display goes through more image updates (e.g., more optical changes), presumably more pixels may be flagged for edge artifacts (e.g., the edge artifact indicator associated with these pixels flagged or turned on). At a later time, these pixels flagged for edge artifact may be cleared or reset all together by a resetting waveform.

Edge Artifact Clearing

The edge artifact data that has been processed may be used at a convenient time to clear the edge artifacts. The clearing process may be triggered or initiated by various conditions.

In some embodiments, a clearing request may be initiated by a host (e.g., a processor), similar to other request sent by the host to the EPDC, and such request may be sent concurrently with other image updating requests. For example, following an interactive dialog where the DUDS waveform mode was used to update the display, to clearing the accumulated edge artifacts due to the DUDS waveform mode, the host may request the EPDC to set a specific time frame for clearing the edge artifacts.

In some other embodiments, the clearing process may be initiated when it is convenient for the display. For example, when the EPDC has become idle for a certain amount of time, the EPDC may choose to initiate a clearing process to clear the edge artifacts using the cumulated edge artifacts data.

In yet another embodiment, this processed image data, which includes identification data of pixels with edge artifacts, may be used by a driving scheme or updating waveform mode that includes waveforms for clearing the edge artifacts. For example, in an application with pen input where the DUDS waveform mode is used for its fast response time, a subsequent waveform mode used for anti-aliasing may include edge artifacts clearing waveforms, and this subsequent waveform mode can utilize the processed image data with the edge artifacts information, to clear the edge artifacts.

Figure 6:
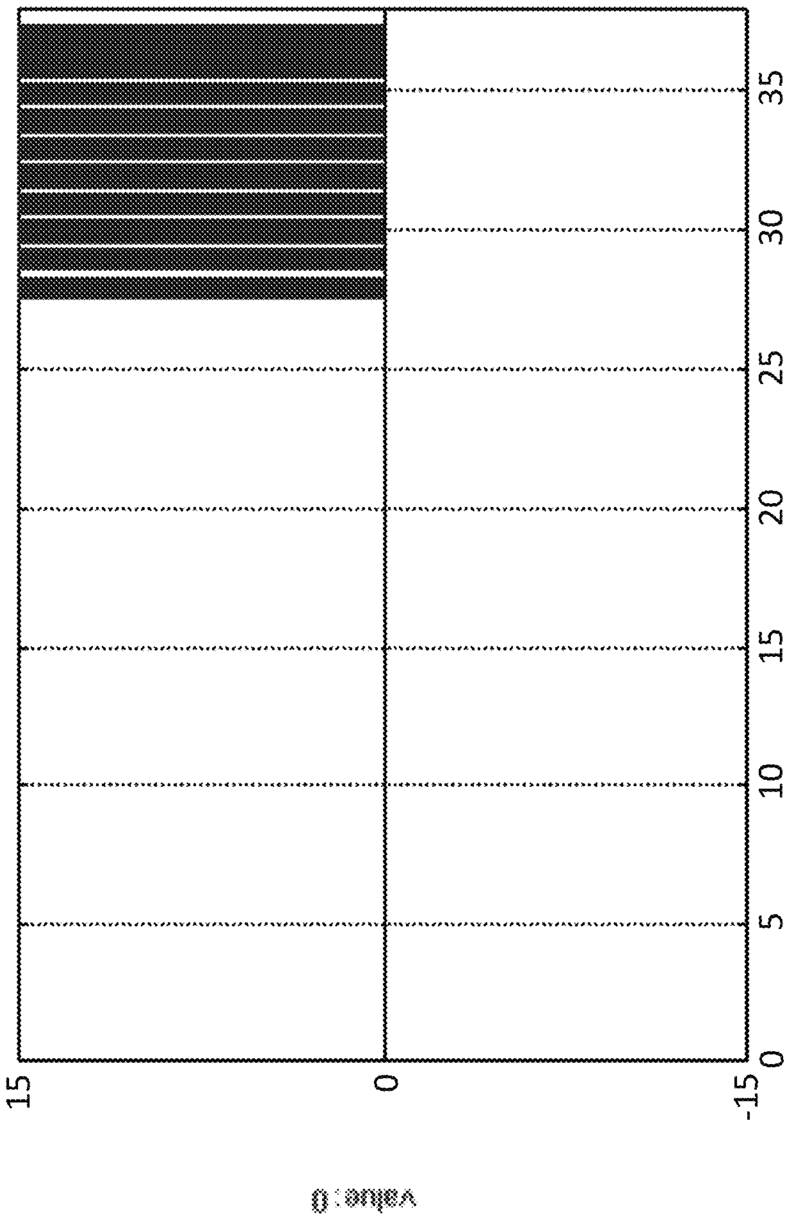
FIG. 6 illustrates a sample Global Edge Clearing (GEC) waveform.

In some embodiments, a Global Edge Clearing (GEC) waveform mode may be used to clear the edge artifacts. FIG. 6 illustrates a sample GEC waveform, where such waveform includes top-off pulses configured to drive a display pixel to an extreme optical state. Such waveform may consist of 6 frames or 66 ms in time duration at 25 Celsius temperature. A GEC may be short in time duration in comparison to a waveform mode with built in edge clearing portions. In this fashion, the GEC may be conveniently adopted to clear edges in connection with a variety of existing driving waveform modes without introducing excessive latencies. For example, when a GEC is used with the DUDS waveform mode mentioned above, because the GEC takes up only a short time duration, post-drive discharge may be performed following the GEC before a subsequent image is updated on the display. In some embodiments, the EPDC may pick and choose which waveform to use depending on the amount of edge artifacts present. For example, if the amount of edge artifacts exceeds a threshold, the EPDC may choose a global clearing waveform (mode) to clear the entire display.

In another embodiment, the EPDC may initiate a clearing waveform if pixels with edge artifacts became too many. For example, the EPDC may have an algorithm configured to keep track the total number of pixels with edge artifacts, and make a comparison to the total number of pixels in the display. Such comparison may be stored as a percentile value in a buffer memory. Such stored value may be periodically compared to a pre-determined threshold value, and if this stored value exceeded the threshold, the EPDC may choose to initiate a Global Clearing waveform mode, where this Global Clearing waveform may reset every pixel within the display (e.g., drive every pixel to an extreme graytone level or color state).

It will be apparent to those skilled in the art that numerous changes and modifications can be made to the specific embodiments of the invention described above without departing from the scope of the invention. Accordingly, the whole of the foregoing description is to be interpreted in an illustrative and not in a limitative sense.

The invention claimed is:

1. A method for driving an electro-optic display having a plurality of display pixels, the method comprising:

updating the electro-optic display with a first image using a first waveform mode;

updating the electro-optic display with a second image subsequent to the first image using the first waveform mode;

updating the electro-optic display with a third image subsequent to the second image using the first waveform mode;

processing image data associated with the first image and the second image in concurrency with the updating of the third image to identify display pixels with edge artifacts;

generating processed image data associated with the identified display pixels;

storing the processed image data associated with the identified display pixels at a memory location; and upon completion of updating the electro-optic display using the first waveform mode, updating the electro-optic display using a second waveform mode, wherein, for each display pixel, the second waveform mode applies a waveform to the display pixel depending on the processed image data associated with the identified display pixels and a pixel graytone transition of the display pixel.

2. The method of claim 1 wherein the first waveform mode effects display pixel transitions from an initial gray level to a final gray level using a unidirectional driving waveform.

3. The method of claim 1 wherein the first waveform mode applies null transition waveforms to display pixels for which the pixel graytone transition is a white to white transition or a black to black transition.

4. The method of claim 1 wherein the first waveform mode is used to display one or more of a menu, a progress bar, a keyboard, and pen input on the electro-optic display.

5. The method of claim 1 wherein the first waveform mode is a direct update waveform mode.

6. The method of claim 1 wherein the second waveform mode applies waveforms for clearing edge artifacts to identified display pixels for which the pixel graytone transition is a white to white transition or a black to black transition.

7. The method of claim 6 wherein the second waveform mode applies a full clearing white to white waveform when the pixel graytone transition is a white to white transition, and a full clearing white to white waveform when the pixel graytone transition is a black to black transition.

8. The method of claim 1 wherein the second waveform mode applies waveforms for clearing edge artifacts to display pixels for which the pixel graytone transition is a white to white transition or a black to black transition, and at least one cardinal neighboring display pixel is an identified display pixel.

9. The method of claim 8 wherein the second waveform mode applies a special white to white edge clearing waveform when the pixel graytone transition is a white to white transition, and a special black to black edge clearing waveform when the pixel graytone transition is a black to black transition.

10. The method of claim 1 further comprising updating the electro-optic display with one or more images using a third waveform update mode upon completion of the second waveform mode.

11. The method of claim 10 wherein the third waveform mode effects display pixel transitions from an initial gray level to an extreme optical state in a first direction, and from the extreme optical state to a final gray level in a second direction, wherein the second direction is the reverse of the first direction.

12. The method of claim 1 wherein the third waveform mode is a gray scale waveform mode.

13. The method of claim 1 wherein processing further comprises determining displays pixels having different graytones than at least one cardinal neighboring display pixel.

14. The method of claim 1 wherein generating processed image data associated with the identified display pixels comprises flagging the identified display pixels with an indicator.

15. The method of claim 1 wherein the memory location is in a buffer memory associated with the display's controller.

* * * * *